United States Patent
Stopplecamp

[11] Patent Number: 5,831,354
[45] Date of Patent: Nov. 3, 1998

[54] BOOT STRAP PROPULSION SYSTEM

[76] Inventor: Timothy J. Stopplecamp, 610 South 3rd. Ave., Bozeman, Mont. 59715

[21] Appl. No.: 915,751

[22] Filed: Aug. 21, 1997

[51] Int. Cl.[6] .................................................... F16H 33/20
[52] U.S. Cl. ............................. 310/12; 74/84 R; 74/845; 244/172; 310/20
[58] Field of Search .................................. 310/12, 20, 80; 74/84 R, 845; 180/7.1, 54.1; 244/62.177; 440/113

[56] References Cited

U.S. PATENT DOCUMENTS 5,685,196   11/1997   Foster, Sr. ................................ 47/84 R

*Primary Examiner*—Thomas M. Dougherty
*Assistant Examiner*—Judson H. Jones

[57] ABSTRACT

A bootstrap propulsion system is provided including a housing with a pair of elliptical track assemblies situated side-by-side within the housing and further positioned in a common plane. A moving mass assembly is situated on each of the track assemblies. The moving mass assemblies are each adapted to move around the associated track assembly such that an instantaneous position thereof on the associated track assembly is a mirror image of that of the other moving mass assembly within the same compartment of the housing. In order reduce the weight of the overall system, movement of the moving mass assemblies is effected by way of a linear motor.

6 Claims, 3 Drawing Sheets

BOOT STRAP PROPULSION SYSTEM

BACKGROUND OF THE INVENTION

1. Field of the Invention

The present invention relates to propulsion systems and more particularly pertains to a new BOOT STRAP PROPULSION SYSTEM for translating centripetal motion into motion having a linear propelling force.

2. Description of the Prior Art

Traditional satellites rely on liquid thruster rockets to alter trajectory and to change speed. These small adjustments are made very rarely for the average satellite to maintain its correct orbit. Such adjustments are, however, implemented in low-flying satellites which are commonly utilized in the telecommunication industry. These satellites will create a global, wireless telephone network. A major concern is the control and maintenance of the array. Small changes in speed, caused by space debris, can create gaps in the array. Continuous adjustments by rockets would soon exhaust the on board supply of fuel.

A propulsion system that can continuously make changes to the speed by a tenth of mile per hour or stop drifting from a precise course is needed. Like everything else on the satellite, the propulsion system needs to be as light weight and compact as possible. The source of power for the propulsion system must also be renewable unlike rockets, The optimal power source would be electricity obtained from solar panels.

The applications of a propulsion system like the one of the present invention would not be limited to only large scale arrays of highly interconnected satellites. A number of different types of satellites would also find some benefits in being able to alter trajectory and maintain altitude. For examples, spy satellites and the array of Landsats would benefit from being able to shift course by a kilometer or so. Long range probes could utilize a continual source of force. Instead of reaching a maximum speed in the first day, a long range probe could continually increase its speed every minute of its trip.

Known prior art propulsion systems include U.S. Pat. No. 4,770,063; U.S. Pat. No. 4,716,515; U.S. Pat. No. 5,182,958; U.S. Pat. No. 4,770,063; U.S. Pat. No. 4,712,439; and U.S. Pat. No. 4,303,214.

In these respects, the BOOT STRAP PROPULSION SYSTEM according to the present invention substantially departs from the conventional concepts and designs of the prior art, and in so doing provides an apparatus primarily developed for the purpose of translating centripetal motion into motion having a linear propelling force with such apparatus being of a lighter weight.

SUMMARY OF THE INVENTION

In view of the foregoing disadvantages inherent in the known types of propulsion systems now present in the prior art, the present invention provides a new BOOT STRAP PROPULSION SYSTEM construction wherein the same can be utilized for translating centripetal motion into motion having a linear propelling force.

The general purpose of the present invention, which will be described subsequently in greater detail, is to provide a new BOOT STRAP PROPULSION SYSTEM apparatus and method which has many of the advantages of the propulsion systems mentioned heretofore and many novel features that result in a new BOOT STRAP PROPULSION SYSTEM which is not anticipated, rendered obvious, suggested, or even implied by any of the prior art propulsion systems, either alone or in any combination thereof.

To attain this, the present invention generally comprises a housing is provided having a top face, a bottom face, and a periphery formed therebetween defining an interior space. The housing has a plurality of compartments located at distinct levels within the interior space thereof. Next provided is a pair of elliptical track assemblies situated side-by-side within each compartment of the housing. Each pair of track assemblies are further positioned in a common plane in parallel with the top and bottom faces. As best shown in FIG. 4, each track assembly comprises an elliptical bottom face with an interior lip integrally coupled to an interior periphery of the bottom face and extended upwardly therefrom. Associated therewith is an exterior lip integrally coupled to an exterior periphery of the bottom face and extended upwardly therefrom. FIGS. 1 & 3 depict a plurality of interior equally spaced track supports integrally coupled to the interior lip and extending therefrom. Further, a plurality of exterior spaced track supports are shown to be integrally coupled to the exterior lip and extending inwardly therefrom. Such track supports serve to have mounted thereto a pair of parallel elliptical tracks each having a circular cross-section. The elliptical tracks include an interior track coupled to the interior spaced track supports and an exterior track coupled to the exterior spaced track supports. With reference again to FIG. 4, a first conductor is provided having an elliptical configuration and a rectilinear cross-section. The first conductor is coupled to a central extent of the bottom face of the track. A second conductor is situated about an entire outer surface of the interior lip. Also included is a moving mass assembly situated on each of the track assemblies. In operation, the moving mass assemblies of a common compartment are adapted to move around the track assemblies such that an instantaneous position thereof on the associated track assembly is a mirror image of that of the other moving mass assembly within the same compartment of the housing. Further, the moving mass assemblies move around the track assemblies such that the instantaneous position thereof is offset from the coincident position of at least one of the moving mass assemblies within a different compartment of the housing. As shown in FIG. 4, each moving mass assembly comprises an inverted U-shaped bracket having a top face and a pair of side faces. As such, an open bottom face and a pair of open ends are defined. Two pairs of rollers are rotatable coupled to the side faces of the bracket about a horizontal axis. Each pair of rollers are slidably coupled to an associated one of the tracks of the track assembly. By this structure, the bracket encompasses the first conductor of the associated track assembly and the bracket is adapted to slide around the associated track assembly. Next provided are brush contacts. For allowing the correct positioning of the brush contacts, an L-shaped arm is included having a horizontal extent coupled to an interior side face of the bracket and a vertical extent depending from the horizontal extent. A plurality of brushes are situated on the vertical extent in electrical communication with the second conductor of the associated track assembly. For allowing the monitoring of the speed of the moving mass assemblies, a speed detector is included. The speed detector includes a laser transmitter situated on a linear arm coupled to the interior side face of the bracket below the horizontal extent of the L-shaped arm. The laser transmitter is adapted to continuously transmit a laser directly upwards. The speed detector further has a laser receiver situated on the horizontal extent of the L-shaped arm directly above the laser transmitter. In use, the laser transmitter transmits a signal upon the lack of receipt of the laser from the laser transmitter as in the case wherein the bracket passes one of the equally spaced interior track supports. Each moving mass assembly further includes a linear stator having an inverted U-shaped configuration. The linear stator is situated within the interior space of the bracket adjacent the open bottom face thereof. Such positioning situates the linear stator on opposite sides of the first conductor of the associated track assembly. In operation, the linear stator is adapted to effect the movement of the moving mass assembly along the associated track assembly. A speed at which the moving mass travels is a function of a frequency of an alternating current received. Also situated within an interior space of the bracket is an inverter. The inverter is connected between the brush contacts and the linear stator for providing alternating current thereto at a predetermined frequency. Finally, a microprocessor is connected between a photo-electric power source and the conductors and inverters. In use, the microprocessor is adapted to selectively govern the predetermined frequency and the current afforded to the inverter first conductor and linear stator. Further, the microprocessor is connected to the laser receivers for utilizing the signals transmitted therefrom as feed back.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new BOOT STRAP PROPULSION SYSTEM apparatus and method which has many of the advantages of the propulsion systems mentioned heretofore and many novel features that result in a new BOOT STRAP PROPULSION SYSTEM which is not anticipated, rendered obvious, suggested, or even implied by any of the prior art propulsion systems, either alone or in any combination thereof.

It is another object of the present invention to provide a new BOOT STRAP PROPULSION SYSTEM which may be easily and efficiently manufactured and marketed.

It is a further object of the present invention to provide a new BOOT STRAP PROPULSION SYSTEM which is of a durable and reliable construction.

An even further object of the present invention is to provide a new BOOT STRAP PROPULSION SYSTEM which is susceptible of a low cost of manufacture with regard to both materials and labor, and which accordingly is then susceptible of low prices of sale to the consuming public, thereby making such BOOT STRAP PROPULSION SYSTEM economically available to the buying public.

Still yet another object of the present invention is to provide a new BOOT STRAP PROPULSION SYSTEM which provides in the apparatuses and methods of the prior art some of the advantages thereof, while simultaneously overcoming some of the disadvantages normally associated therewith.

Still another object of the present invention is to provide a new BOOT STRAP PROPULSION SYSTEM for translating centripetal motion into motion having a linear propelling force.

Yet another object of the present invention is to provide a new BOOT STRAP PROPULSION SYSTEM with the purpose of reducing the size, weight and salability of the previous propulsion systems.

Even still another object of the present invention is to provide a new BOOT STRAP PROPULSION SYSTEM that includes a housing with a pair of elliptical track assemblies situated side-by-side within the housing and further positioned in a common plane. A moving mass assembly is situated on each of the track assemblies. The moving mass assemblies are each adapted to move around the associated track assembly such that an instantaneous position thereof on the associated track assembly is a mirror image of that of the other moving mass assembly within the same compartment of the housing. In order reduce the weight of the overall system, movement of the moving mass assemblies is effected by way of a linear motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
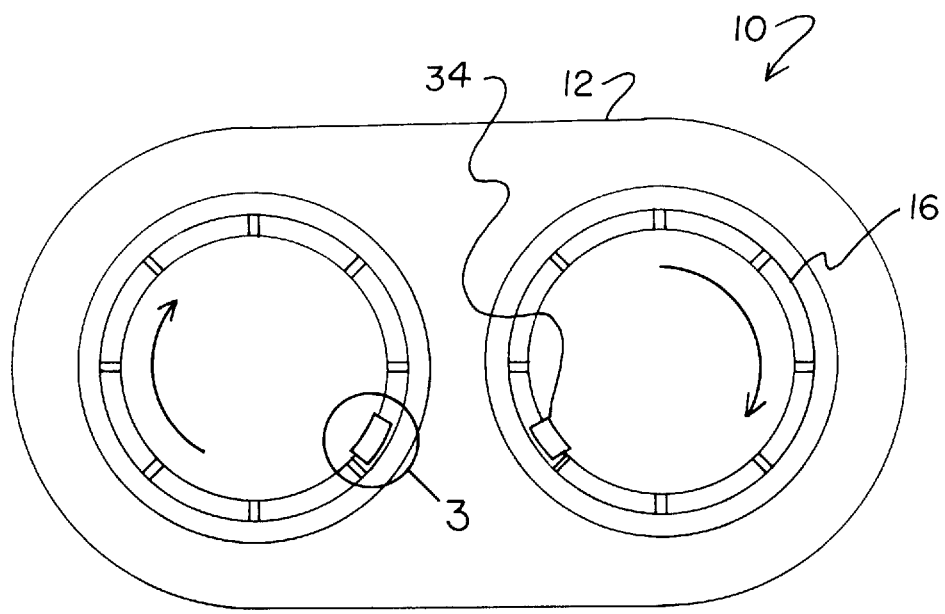
FIG. 1 is a top view of a new BOOT STRAP PROPULSION SYSTEM according to the present invention.

With reference now to the drawings, and in particular to FIGS. 1 through 5 thereof, a new BOOT STRAP PROPUL- SION SYSTEM embodying the principles and concepts of the present invention and generally designated by the reference numeral 10 will be described.

Figure 2:
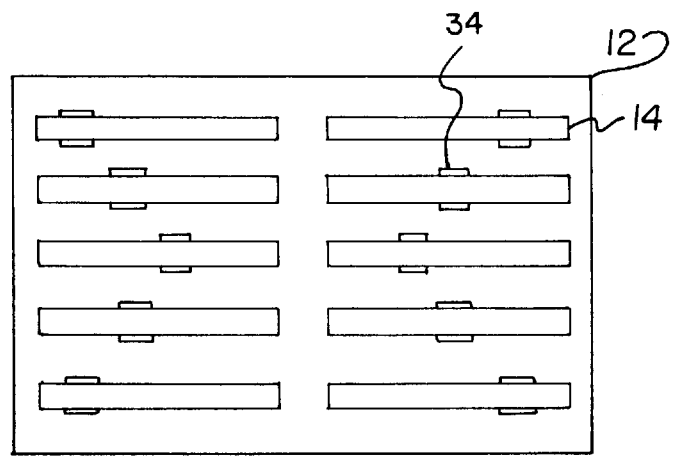
FIG. 2 is a side view of the present invention.

As shown in FIGS. 1 & 2, a housing 12 is provided having a top face, a bottom face, and a periphery formed therebetween defining an interior space. The housing has a plurality of compartments 14 located at distinct levels within the interior space thereof.

Figure 4:
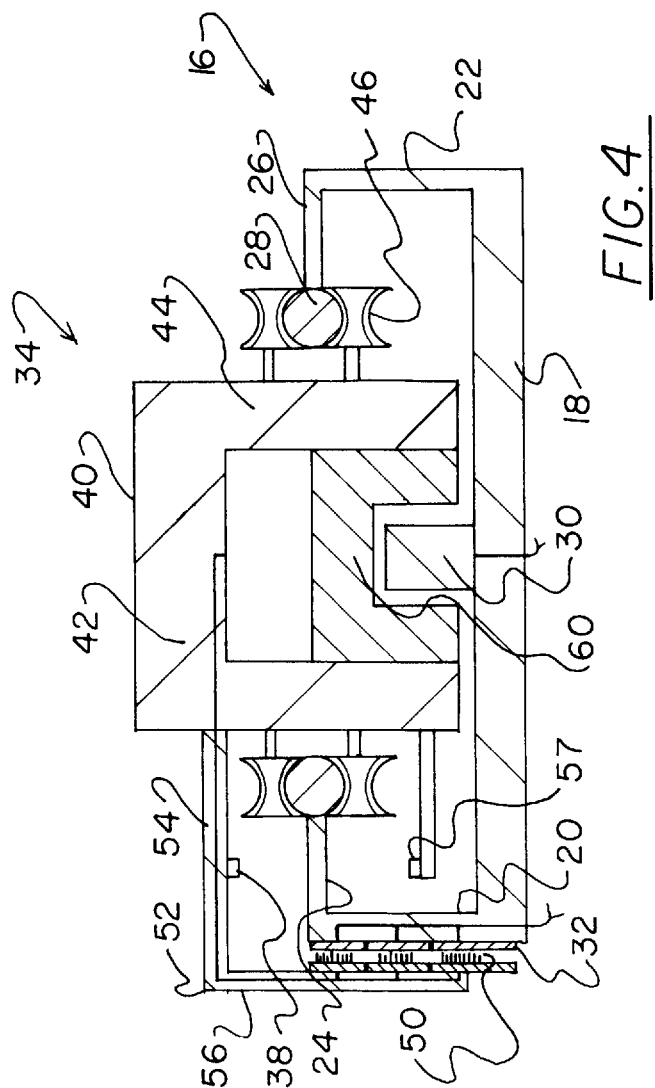
FIG. 4 is a cross-sectional view of the present invention taken along line 4—4 shown in FIG. 3.

Next provided is a pair of elliptical track assemblies 16 situated side-by-side within each compartment of the housing. Each pair of track assemblies is further positioned in a common plane in parallel with the top and bottom faces. As best shown in FIG. 4, each track assembly comprises an elliptical bottom face 18 with an interior lip 20 integrally coupled to an interior periphery of the bottom face and extended upwardly therefrom. Associated therewith is an exterior lip 22 integrally coupled to an exterior periphery of the bottom face and extended upwardly therefrom. It should be noted that at least the bottom face is integrally coupled to the housing.

Figure 3:
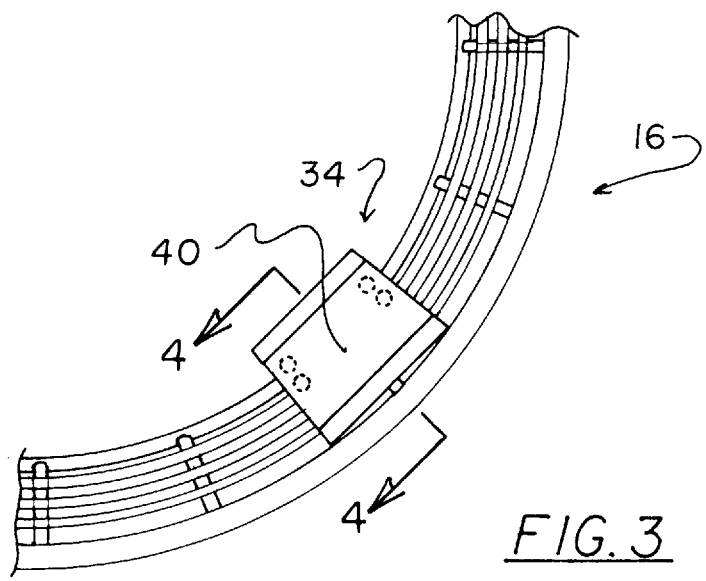
FIG. 3 is a sectional view of one of the track assemblies of the present invention.
Figure 5:
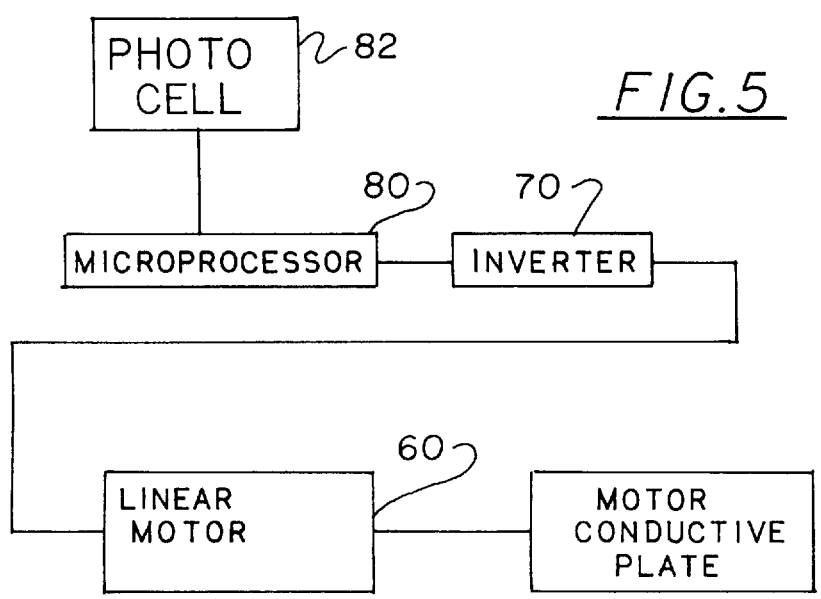
FIG. 5 is a schematic diagram of the present invention.

FIGS. 1 & 3 depict a plurality of interior equally spaced track supports 24 integrally coupled to the interior lip and extending therefrom. Further, a plurality of exterior spaced track supports 26 are shown to be integrally coupled to the exterior lip and extending inwardly therefrom. Such track supports have mounted thereto a pair of parallel elliptical tracks 28 each having a circular cross-section. The elliptical tracks include an interior track coupled to the interior spaced track supports and an exterior track coupled to the exterior spaced track supports.

With reference again to FIG. 4, a first conductor 30, or rotor, is provided having an elliptical configuration and a rectilinear cross-section. The first conductor is coupled to a central extent of the bottom face of the track. A second conductor 32 is situated about an entire outer surface of the interior lip.

Also included is a moving mass assembly 34 situated on each of the track assemblies. In operation, the moving mass assemblies of a common compartment are adapted to move around the track assemblies such that an instantaneous position thereof on the associated track assembly is a mirror image of that of the other moving mass assembly within the same compartment of the housing. Further, the moving mass assemblies move around the track assemblies such that the instantaneous position thereof is offset from the coincident position of at least one of the moving mass assemblies within a different compartment of the housing. The means to accomplish this will be set forth in greater detail hereinafter.

As shown in FIG. 4, each moving mass assembly comprising inverted U-shaped bracket 40 having a top face 42 and a pair of side faces 44. As such, an open bottom face and a pair of open ends are defined. Two pairs of rollers 46 are rotatable coupled to the side faces of the bracket about a horizontal axis. Each pair of rollers are slidably coupled to an associated one of the tracks of the track assembly. By this structure, the bracket encompasses the first conductor of the associated track assembly and the bracket is adapted to slide around the associated track assembly.

In order to maintain a constant angular velocity, the mass must be riding firmly on the track. The mass must have two sets of rollers, one to ride on the track and the other set of rollers to ride under the track. For half the cycle one set of rollers will be applying a force on the track while the other set of rollers will apply a neglectable amount of force. The forces of the sets of rollers will switch. The switching of forces means the sets of rollers take turn in holding the mass to the track.

Next provided are brush contacts 50. For allowing the correct positioning of the brush contacts, an L-shaped arm 52 is included having a horizontal extent 54 coupled to an interior side face of the bracket and a vertical extent 56 depending from the horizontal extent. A plurality of brushes are situated on the vertical extent in electrical communication with the second conductor of the associated track assembly. In the preferred embodiment, the second conductor is actually a plurality of distinct conductors to which separate brushes abut. This is important so that multiple connections may be made with the bracket for reasons that will become apparent hereinafter.

For allowing the monitoring of the speed of the moving mass assemblies, a speed detector is included. The speed detector includes a laser transmitter 57 situated on a linear arm coupled to the interior side face of the bracket below the horizontal extent of the L-shaped arm. The laser transmitter is adapted to continuously transmit a laser directly upwards. The speed detector further has a laser receiver 58 situated on the horizontal extent of the L-shaped arm directly above the laser transmitter. In use, the laser transmitter transmits a signal upon the lack of receipt of the laser from the laser transmitter as in the case wherein the bracket passes one of the equally spaced interior track supports. Such signal may be transmitted from the moving mass assembly via one of the brush contacts by way of an unillustrated line.

Each moving mass assembly further includes a linear stator 60 having an inverted U-shaped configuration. The linear stator is situated within the interior space of the bracket adjacent the open bottom face thereof. Such positioning situates the linear stator on opposite sides of the first conductor of the associated track assembly. In operation, the linear stator is adapted to effect the movement of the moving mass assembly along the associated track assembly. A speed at which the moving mass travels is a function of a frequency of an alternating current received by the stator.

It should be noted that, together, the first conductor and the linear stator form an induction motor. Induction motors work because of Lorentz forces on a conductor. When a current-carrying conductor is placed in a magnetic field, it is subjected to a force which we call electromagnetic force. A linear induction motor is a regular induction motor uncoiled. The first conductor is placed between tracks and can be considered the rotor of the motor. The stator of the motor is the linear motor itself. As the power's phase shifts in the stator a opposite and equal electrical force is seen in the rotor. For half the phase, 0 to 180 degrees the positive voltage can be considered a north pole. From 180 to 360 degrees the phase shift creates a south pole. Standard induction motors utilize three phases to generate a traveling wave. The traveling wave literally tries to drag the rotor along. The rotor will tends to keep up with the peak north pole at 90 degrees. In the case of linear induction motors the rotor is fixed so it is the stator that physically moves with respect to the center.

The stator will never try to lead the north pole peak at 90 degrees. It will lag the phase shift due to the inductive effect and this is referred to the slip of the motor. If the inductive effect is too great that the rotor magnetization can not keep up with the magnetic field, the rotor is said to be saturated. This means the slip is equal to the speed of the wave form and thus the motor can not move. In most cases the rotor is made out of aluminum, copper or iron plate. The saturation frequencies of these materials are around 1 kHz. Standard linear induction motors usually operate at frequencies which do not exceed 700 Hz.

Also situated within an interior space of the bracket is an inverter 70. The inverter is connected between the brush contacts and the linear stator for providing alternating current thereto at a predetermined frequency.

The velocity of the linear induction motor is a function of the width of one pole-pitch and the frequency. Since the width of a pole-pitch is based on the geometric shape of the stator, it can not be adjusted. To adjust the speed, the frequency must be adjusted. Inverters are used to adjust the power between 0 and 700 Hz. The simplest inverters operate off 555 timers. 555 timers use an external resistor and capacitor (RC) network. The RC network controls the timing of a internal crystal. In the present embodiment, the RC networks of each of the moving mass assemblies are positioned in a centralized location and are connected to the 555 timer via one of the brushes and second conductors. A square wave pulse is generated at the desired frequency. This square wave can be converted into a sinusoid wave by a transistor, diode and inductive network or directly through the chip. Once the frequency of the power has been modulated to the desired frequency, the power is sent to the linear induction motor. As stated before, linear induction motors are just unraveled induction motors. Instead of the standard squirrel cage, you can thing of it as a magnetic ladder. As in all motors, the machine needs a power source. DC power can be obtained by means of a brush assembly. A brush assembly can connect the power directly to the inverter. The inverter modulates the power and sends it to the stator and the mass moves.

Finally, a microprocessor 80 is connected between a photoelectric power source 82 and the conductors and inverters. In use, the microprocessor is adapted to selectively govern the predetermined frequency. This is accomplished by the manipulation of the RC networks of the inverters by way of a potentiometer of the like. The magnitude of current afforded to the inverter, first conductor and linear stator is also controlled by the microprocessor. Further, the microprocessor is connected to the laser receivers for utilizing the signals transmitted therefrom as feed back.

Modulation of the frequencies is the key to controlling the induction motor and therefor the mass's rotation. The rotation of the mass must maintain a constant angular velocity. A constant angular velocity on a non circular path means the velocity must change. The velocity must speed up for half the cycle and slow down for the other half of the cycle. In the present invention this is accomplished via the speed detector. With it use, the position of the moving mass assemblies are always known. The number and position of track supports will never change. The time the mass takes to get to a track support divided by the distance to each of the track supports is the velocity of the mass. The on-board microprocessor can determine the angular velocity by the position of the two track supports in relationship from the center of rotation. The microprocessor is then able to determine the frequency modulation of the inverter. The microprocessor then determines if the mass needs to speed up or slow down. This process maintains a constant angular velocity of the mass.

The major objective of the proposed design is to reduce the size, weight and salability of the previous non-linear propulsion and energy conversion systems. These factors are critical in the construction of satellites. Traditionally the power source of the rotating mass was a torque source. The key to the proposed design is to use linear inductor motors to rotate and maintain the constant angular velocity for the mass. This would eliminate the need for an external torque source, flywheel, and the mechanical connections to the mass. The absence of these mechanical components will not only reduce the weight and size, but also easy the salability of the design. The reduction in physical size and weight is the key attribute that separates this design from previous patents.

The present invention produces a low intensity source of force. The low intensity source of force is designed to absorb vibrations, change directions and increase the velocity of vehicles by only a fraction at a time. But since the design is powered by electricity, the increase of velocity can be continuous. The design uses current technology and reduces the weight and space of the impulse drive.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bootstrap propulsion system comprising, in combination:

a housing having a top face, a bottom face, and a periphery formed therebetween defining an interior space, the housing having a plurality of compartments located at distinct levels within the interior space thereof;

a pair of elliptical track assemblies situated side-by-side within each compartment of the housing and further positioned in a common plane in parallel with the top and bottom faces, each track assembly comprising:

an elliptical bottom face with an interior lip integrally coupled to an interior periphery of the bottom face and extending upwardly therefrom and an exterior lip integrally coupled to an exterior periphery of the bottom face and extending upwardly therefrom, a plurality of interior equally spaced track supports integrally coupled to the interior lip and extending inwardly therefrom and a plurality of exterior spaced track supports integrally coupled to the exterior lip and extending inwardly therefrom, a pair of parallel elliptical tracks each having a circular cross-section, the elliptical tracks including an interior track coupled to the interior spaced track supports and an exterior track coupled to the exterior spaced track supports, a first conductor having an elliptical configuration and a rectilinear cross-section, the first conductor coupled to a central extent of the bottom face of the track, and a second conductor situated about an entire outer surface of the interior lip;

a moving mass assembly situated on each of the track assemblies, the moving mass assemblies of a common compartment adapted to move around the track assemblies such that an instantaneous position thereof on the associated track assembly is a mirror image of that of the other moving mass assembly within the same compartment of the housing, the moving mass assemblies further adapted to move around the track assemblies such that the instantaneous position thereof is offset from the coincident position of at least one of the moving mass assemblies within a different compartment of the housing, each moving mass assembly comprising:

an inverted U-shaped bracket having a top face and a pair of side faces defining an open bottom face and a pair of open ends, two pairs of rollers rotatable coupled to the side faces of the bracket about a horizontal axis, each pair of rollers adapted to be slidably coupled to an associated one of the tracks of the track assembly whereby the bracket encompasses the first conductor of the associated track assembly and the bracket is adapted to slide around the associated track assembly, brush contacts including an L-shaped arm having a horizontal extent coupled to an interior side face of the bracket and a vertical extent depending from the horizontal extent with a plurality of brushes situated thereon in electrical communication with the second conductor of the associated track assembly, a speed detector including a laser transmitter situated on a linear arm coupled to the interior side face of the bracket below the horizontal extent of the L-shaped arm and adapted to continuously transmit a laser directly upwards, the speed detector further having a laser receiver situated on the horizontal extent of the L-shaped arm directly above the laser transmitter, the laser transmitter adapted to transmit a signal upon the lack of receipt of the laser from the laser transmitter as in the case wherein the bracket passes one of the equally spaced interior track supports, a linear stator having an inverted U-shaped configuration and situated within the interior space of the bracket adjacent the open bottom face thereof and situated on opposite sides of the first conductor of the associated track assembly, the linear stator adapted to effect the movement thereof along the associated track assembly with a speed that is a function of a frequency of an alternating current received, and an inverter situated within an interior space of the bracket and connected between the brush contacts and the linear stator for providing alternating current thereto at a predetermined frequency; and a microprocessor connected between a photo-electric power source and the conductors and inverters, the microprocessor adapted to selectively govern the predetermined frequency and the current afforded to the inverter first conductor and linear stator, whereby the microprocessor is connected to the laser receivers for utilizing the signals transmitted therefrom as feed back.

2. A bootstrap propulsion system comprising:

a housing having a plurality of compartments located at distinct levels within the interior space thereof;

a pair of elliptical track assemblies situated side-by-side within each compartment of the housing and further positioned in a common plane;

a moving mass assembly situated on each of the track assemblies, the moving mass assemblies of a common compartment adapted to move around the track assemblies such that an instantaneous position thereof on the associated track assembly is a mirror image of that of the other moving mass assembly within the same compartment of the housing, the moving mass assemblies further adapted to move around the track assemblies such that the instantaneous position thereof is offset from the coincident position of at least one of the moving mass assemblies within a different compartment of the housing.

3. A bootstrap propulsion system as set forth in claim 2 and further including a speed detector adapted to monitor the speed of each moving mass assembly.

4. A bootstrap propulsion system as set forth in claim 2 wherein movement of the moving mass assemblies is effected by way of a linear motor.

5. A bootstrap propulsion system as set forth in claim 2 wherein the moving mass assemblies are powered by solar power.

6. A bootstrap propulsion system comprising:

a housing;

a pair of elliptical track assemblies situated side-by-side within the housing and further positioned in a common plane;

a moving mass assembly situated on each of the track assemblies, the moving mass assemblies adapted to move around the track assemblies such that an instantaneous position thereof on the associated track assembly is a mirror image of that of the other moving mass assembly within the same compartment of the housing;

wherein movement of the moving mass assemblies is effected by way of a linear motor.

* * * * *